United States Patent
Halek

(10) Patent No.: US 9,233,726 B2
(45) Date of Patent: Jan. 12, 2016

(54) SPOKE CLIP FOR ELECTROLUMINESCENT WIRE DISPLAY

(71) Applicant: Justin Halek, Traverse City, MI (US)

(72) Inventor: Justin Halek, Traverse City, MI (US)

( * ) Notice: Subject to any disclaimer, the term of this patent is extended or adjusted under 35 U.S.C. 154(b) by 251 days.

(21) Appl. No.: 14/070,167

(22) Filed: Nov. 1, 2013

(65) Prior Publication Data

US 2014/0126231 A1    May 8, 2014

Related U.S. Application Data

(60) Provisional application No. 61/723,076, filed on Nov. 6, 2012.

(51) Int. Cl.
*B62J 6/20* (2006.01)
*F21V 21/088* (2006.01)
*F21V 21/08* (2006.01)
*F16B 2/22* (2006.01)

(52) U.S. Cl.
CPC ... *B62J 6/20* (2013.01); *F16B 2/22* (2013.01); *F21V 21/08* (2013.01); *F21V 21/088* (2013.01); *Y10T 24/44* (2015.01)

(58) Field of Classification Search
CPC ........ B62J 6/20; B62J 6/00; F21W 2101/023; F16B 2/22; Y10T 24/44; F21V 17/00; F21V 17/16; F21V 19/00; F21V 19/004; F21V 21/08; F21V 21/0885
See application file for complete search history.

(56) References Cited

U.S. PATENT DOCUMENTS

| | | | | |
|---|---|---|---|---|
| 3,834,765 A | * | 9/1974 | Trimble | B62J 6/20 301/37.107 |
| 4,763,230 A | * | 8/1988 | Cummings | B62J 6/20 340/432 |
| 7,488,100 B2 | * | 2/2009 | Roberts | B62J 6/20 362/184 |
| 8,337,060 B1 | | 12/2012 | Frankovich | |
| 8,449,157 B2 | | 5/2013 | Guzik et al. | |
| 8,545,068 B2 | | 10/2013 | Frankovich | |
| 2013/0015764 A1 | | 1/2013 | Frankovich | |
| 2013/0334961 A1 | | 12/2013 | Frankovich | |

OTHER PUBLICATIONS

Bike Glow, BikeGlow Safety Light, www.bikeglow.com (archived webpage), Mar. 25, 2010, 2 pages, Bike Glow, U.S.
Revolights, Revolights—Join the Revolution, www.revolights.com (archived webpage), Sep. 24, 2011, 10 pages, Revolights, U.S.

\* cited by examiner

*Primary Examiner* — Bao Q Truong
(74) *Attorney, Agent, or Firm* — Northern Michigan Patent Law, PLC

(57) ABSTRACT

A spoke clip adapted to be removably secured to a spoke nut of a bicycle wheel, and further adapted to mount an illuminated wire to the spokes of the bicycle wheel. The clips are generally L- or T-shaped, with a slotted stem having a spoke-admitting initial width and terminating in a spoke nut socket, and a wire-mounting arm perpendicular to the stem and adapted to receive and hold a wire in parallel to the axis of the stem. The invention also includes the illuminated wire display created by securing an illuminated wire in a planar array to the spokes adjacent the wheel rim using a plurality of the spoke clips.

8 Claims, 3 Drawing Sheets

SPOKE CLIP FOR ELECTROLUMINESCENT WIRE DISPLAY

RELATED APPLICATIONS/PRIORITY BENEFIT CLAIM

This application claims the benefit of U.S. Provisional Application No. 61/723,076, filed Nov. 6, 2012 by the same inventor (Halek), the entirety of which provisional application is hereby incorporated by reference.

FIELD

The subject matter of the present application is in the field of electroluminescent wire displays for bike wheels, and in particular devices for securing such wire to a bike wheel.

BACKGROUND

Many devices for illuminating bicycles (bikes) at night are known. One example is the Bikeglow™ safety light, consisting of an electroluminescent wire and a battery power unit adapted to be mounted on a bike. Normally the wire is wound around portions of the bike frame, away from moving parts and cables; however, I have seen the electroluminescent wire taped to the spokes of a bike wheel, with the power unit secured to rotate with the wheel between the spokes.

The Revolights™ bike lighting system consists of two narrow rings of LEDs that mount directly to each wheel using a series of clips and ring spacers. The clips are three-part clips, each clip having a spoke-clamping base with a screw-receiving bore and a slot that snaps loosely over a spoke, a cross-bar adapted to be secured to the spoke-clamping base with a screw, and the screw. The spoke-clamping base rotates loosely around the spoke until the cross-arm is tightened in place with the screw, activating the clamping halves of the base to frictionally lock it against rotation on the spoke. The cross-arm is sized to span the wheel width, and the ends of the cross-arms include screw-receiving bores so that slotted portions of the LED rings aligned over the rims on each side of the wheel can be fastened to the clips with screws.

While the Revolights™ LED rings produce a useful ground level headlight/taillight effect at the leading/trailing edges of the front and rear wheels, in addition to side illumination for visibility by others, the multi-part clips are relatively complicated to manipulate and secure to the spokes, and the LED rings and associated hardware needed to align, install, and operate the lights make a system that is unnecessarily complicated and expensive for simple side illumination of the wheels.

BRIEF SUMMARY

I have invented a spoke clip especially for mounting electroluminescent and equivalent lighted wire to the spokes of a bike wheel. My invention in a first aspect is the clip itself, and in a second aspect is the combination of the clips and the resulting illuminated wire array secured to the bike wheel with the clips.

My clip is a generally L- or T-shaped clip with a spoke-engaging stem and an integral wire-mounting arm generally perpendicular to the stem. The stem is split by an open-ended slot running from the outer end of the stem toward the junction of the stem and the wire-mounting arm, the slot dividing the stem longitudinally into flexible halves and oriented generally perpendicular to the wire-mounting arm. The slot has an initial width at its outer end narrower than the diameter of a spoke, and terminates at its inner end in a spoke nut socket having a second width greater than the diameter of a spoke and approximately equal to, and preferably slightly less than, the width of a spoke nut, sufficient for a snug fit. The wire-mounting arm includes at least one open-ended wire slot sized to securely receive and hold a wire on an axis generally parallel to the spoke-engaging stem.

When the clip is applied to a spoke, the spoke nut socket radially receives and loosely engages the spoke. Sliding the clip outwardly to the wheel rim along the spoke causes the spoke nut socket to axially mate with and tightly engage the spoke nut. The result is that the clip can be rotated freely when initially mounted on a spoke, but resists rotation when engaged with the spoke nut.

In its second aspect, the clip is mounted on a spoke nut, and rotated to a wire-engaging position in which the stem is generally parallel to the plane of the wheel, and in which the wire-mounting arm is generally perpendicular to the plane of the wheel. An electroluminescent (EL) wire is clipped to the slot in the wire-mounting arm, which positions the wire relative to the adjacent spokes, running generally in or parallel to the plane of the wheel. Mounting multiple clips around the wheel allows the wire to be mounted in whatever pattern desired in a plane generally parallel to the plane of the wheel, positioned close to the spokes.

The resulting illuminated display on the bike wheel is more secure, more aerodynamic, and provides a more steady or solid light pattern (without flickering) than prior art devices and systems. The resulting illuminated display is just as visible when stationary as when moving.

These and other features and advantages of the invention will become apparent from the detailed description below, in light of the accompanying drawings.

DETAILED DESCRIPTION

Figure 1:
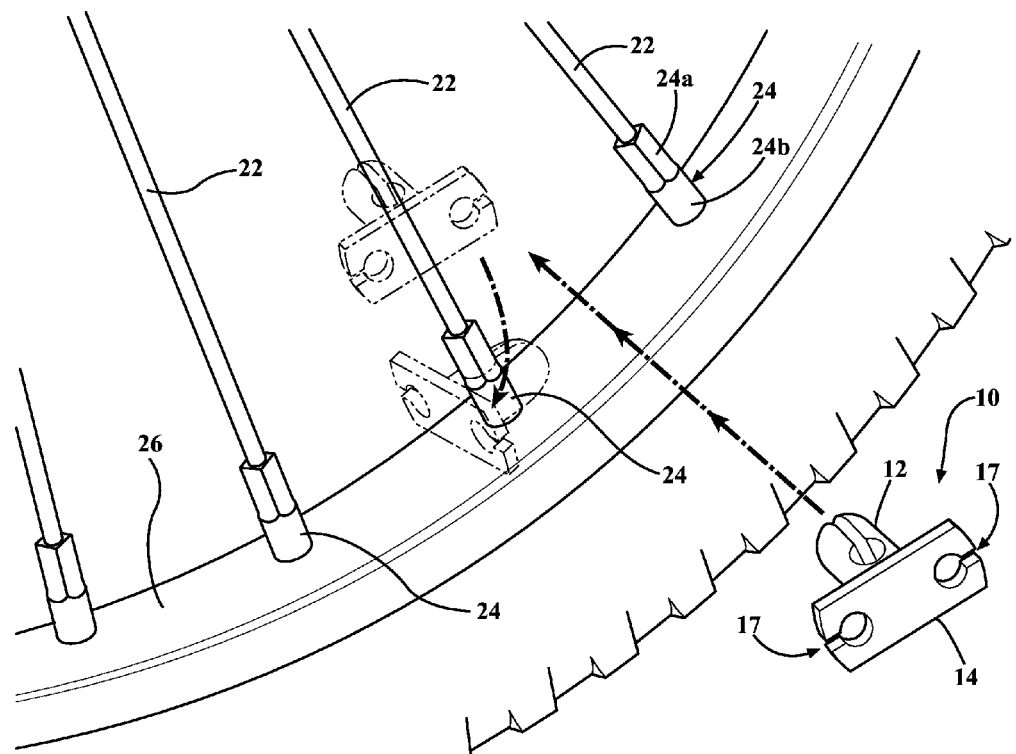
FIG. 1 is an exploded assembly view, in perspective, of an exemplary clip according to the present invention being installed on a spoke.
Figure 2:
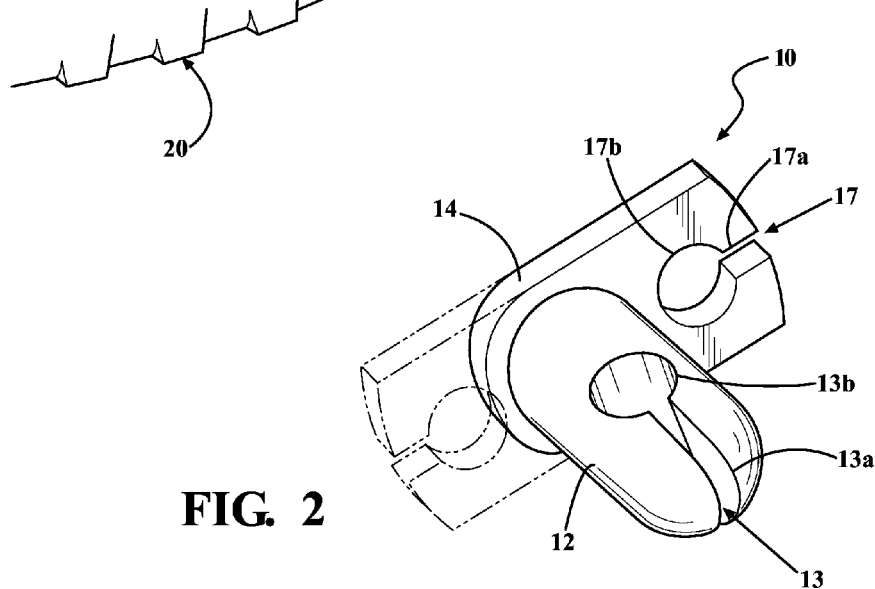
FIG. 2 is an opposite perspective view of the clip of FIG. 1.
Figure 3:
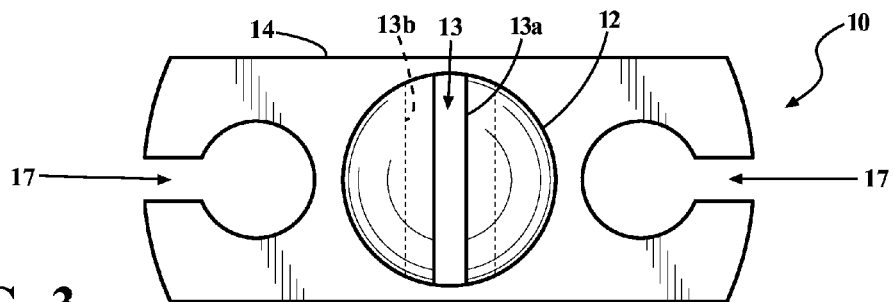
FIG. 3 is a stem end view of the clip of FIG. 1.

Referring first to FIGS. 1 through 3, a spoke clip 10 is shown in exemplary form in order to teach how to make and use the claimed invention. Spoke clip 10 is designed to be attached to the spokes 22 of a bike wheel 20, and in particular to be secured in use to the spoke nuts 24 that join the spokes to the rim 26 of the wheel. Bike wheel 20 in the illustrated example should be understood to represent primarily bicycle wheels, but also scooter, motorcycle, and other types of similarly-spoked wheel, without limitation.

Spoke clip 10 includes a spoke-mounting stem 12 and a wire-holding arm 14 generally perpendicular to the stem. Although clip 10 is illustrated as a generally T-shaped clip capable of holding two wires, one on each side of the stem, it will be understood that generally L-shaped clips for holding a single wire are also possible. FIG. 2 shows one of the wire-holding arms 14 in phantom, such that the solid line portion of the drawing represents such an L-shaped clip.

Wire-mounting arm 14 is integral with stem 12, in that they are a single piece not requiring assembly at the point of application to the spokes of a bike wheel. The entire clip is preferably molded from a plastic material such as nylon or polypropylene that tends to deform rather than break when stressed; other suitable materials may be known to those skilled in the art, including relatively soft metals or metals with deformable inserts capable of a friction fit with a spoke nut. While molding is the preferred method of manufacture, other methods of forming clip 10 are possible, depending on the material used, including but not limited to machining or casting.

Still referring to FIGS. 1 through 3, the stem 12 of clip 10 is split into two flexible longitudinal sections by a slot 13, the slot divided into two regions: a narrower entry region 13a whose width is less than the width of a spoke 26, and a wider socket region 13b at its terminal end adjacent the junction of stem 12 and wire-holding arm 14. The socket region defines a nut socket 13b whose diameter or width (depending on its cross-section and material) is sized approximately equal to and preferably slightly smaller than the spoke nut for a snug axial and radial friction fit over spoke nut 24, so that the clip resists rotation around the nut and also resists sliding axially off the nut down onto the spoke.

The wire-mounting arm 14 of clip 10 ends in open wire-mounting slots 17, having narrower entry portions 17a smaller than the diameter of the EL wire and larger terminal portions 17b approximating the diameter of the wire. The axis of terminal portions 17b of the slots is generally parallel to the axis of stem 12.

Spoke nuts such as 24 tend to have square cross-sections, although spoke nuts with circular cross-sections, or with half-square/half-round sections 24a/24b (FIG. 1) are also known. In the illustrated example, socket 13b has a circular cross-section, which in combination with the use of a deformable plastic material for the clip body (for example, nylon or polypropylene) has been found to produce a secure frictional fit over either square or round spoke nuts whose width or diameter is slightly greater than the diameter of socket 13b. It would also be possible to form socket 13b with a polygonal (e.g. square) cross-section to mate with the shape of a particular style of polygonal spoke nut, but in such a case the dimensions of the socket should still be at least slightly less than the dimensions of the nut for a snug axial fit.

In FIG. 1, clip 10 is first shown clipped over the spoke 22, radially inwardly of spoke nut 24 (upper phantom lines), and then moved down the spoke into frictional engagement with the spoke nut (lower phantom lines). Clip 10 is also rotated to put stem 12 in alignment with rim 26 and to put wire-mounting arm 14 perpendicular to the plane of the wheel, preferably before engagement with the spoke nut depending on the relative dimensions of the socket 13b and the nut and the tightness of the fit between them.

The initial fit of clip 10 over spoke 22 is rotationally and radially loose, allowing the clip to rotate freely on the spoke, and to slide up and down the spoke, while preventing the clip from popping off the spoke axially without a significant, intentional pull in the direction from which it was applied. The final fit of clip 10 over the spoke nut 24 is rotationally, radially, and axially tight, resisting rotation of the clip around the spoke nut, sliding of the clip off the spoke nut onto the spoke, and pulling or popping of the clip off the spoke nut (and off the wheel).

FIG. 2 shows approximately half of the wire-mounting arm 14 in phantom, illustrating the option in solid lines of a generally L-shaped clip rather than a T-shaped clip. It should be understood that the terms L-shaped and T-shaped are to be understood approximately and generally and not in a limiting sense, and that the illustrated shape and proportions of the clip stem 12 (rounded) and the wire-mounting arm 14 (flat) are not limiting, but represent a currently preferred example.

Figures 4A, 4B:
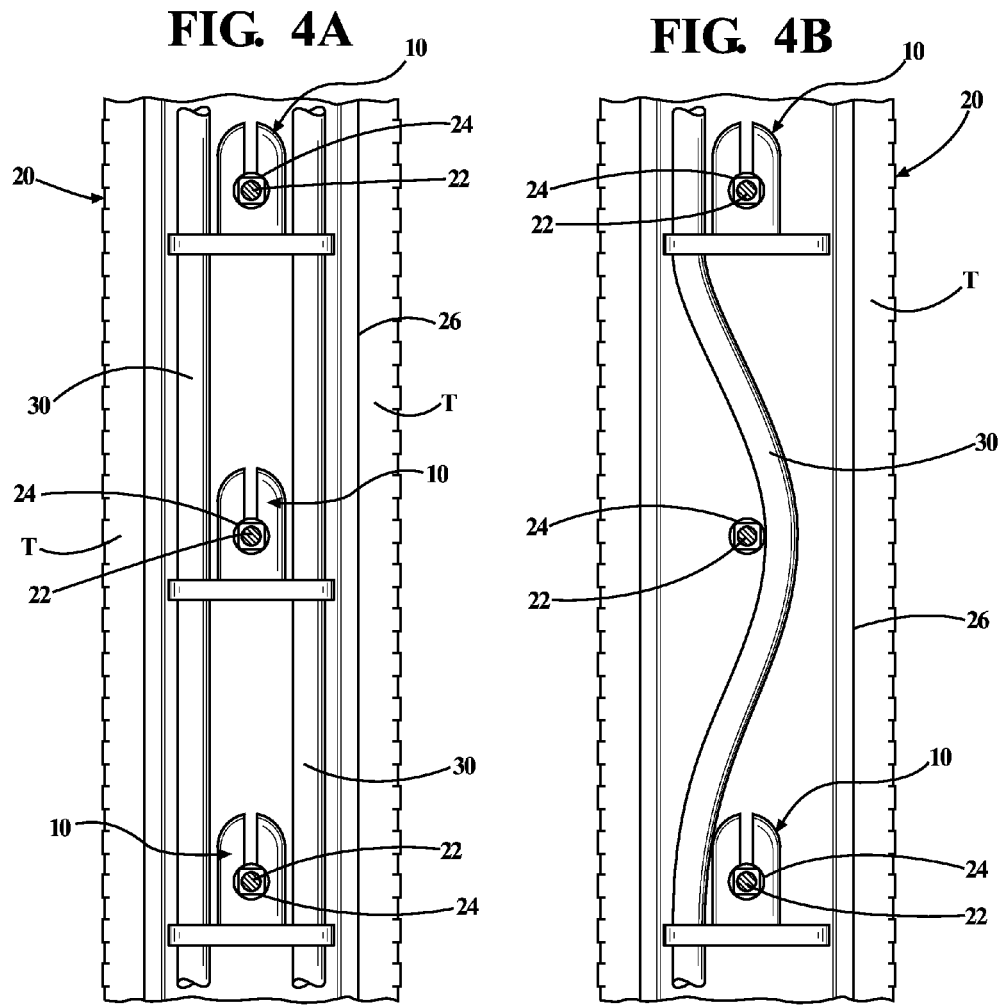
FIGS. 4A and 4B are top views of clips installed on successive spokes of a bike wheel, sectioned through the spokes, showing different ways of guiding the wire from spoke to spoke.

FIGS. 4A and 4B illustrated clips 10 mounted on successive spokes 22 of a wheel 20. In FIG. 4A, clips 10 each support two wires 30, one wire on each side of wheel 20 running in a straight line from clip to clip, and remaining on the outside of the spokes. In FIG. 4B, each clip supports one wire, and the wire is woven around successive spokes from side to side of the wheel. Other examples and patterns are also possible, whether using one or two wires and whether using T-shaped (two-wire holding) or L-shaped (one-wire holding) clips 10. The wire-mounting arm 14 extends laterally beyond adjacent spokes 22, but preferably has a length less than the width of the wheel rim, so that it remains within the width of wheel rim 26 in order to prevent contact with other parts of the bike when the wheel rotates.

In general, however, the wire 30 clipped to the spokes can be considered to form a generally planar illuminated array in the plane of the wheel, whether limited to the outside of the spokes on one side of the wheel or woven back and forth across the rim centerline from spoke to spoke. The alignment of the wire 30 between clips 10 will also vary somewhat depending on the alignment of successive spoke nuts on the wheel rim. Some wheels are noted to have spoke nuts aligned on the centerline of the wheel rim, while others have a staggered, alternating pattern of spoke nuts offset to either side of the rim centerline.

Although clips 10 are shown on every spoke 22 or on every other spoke 22 in the illustrated examples of FIGS. 4A and 4B, the spacing of clips 10 around the wheel can be varied.

Figure 5:
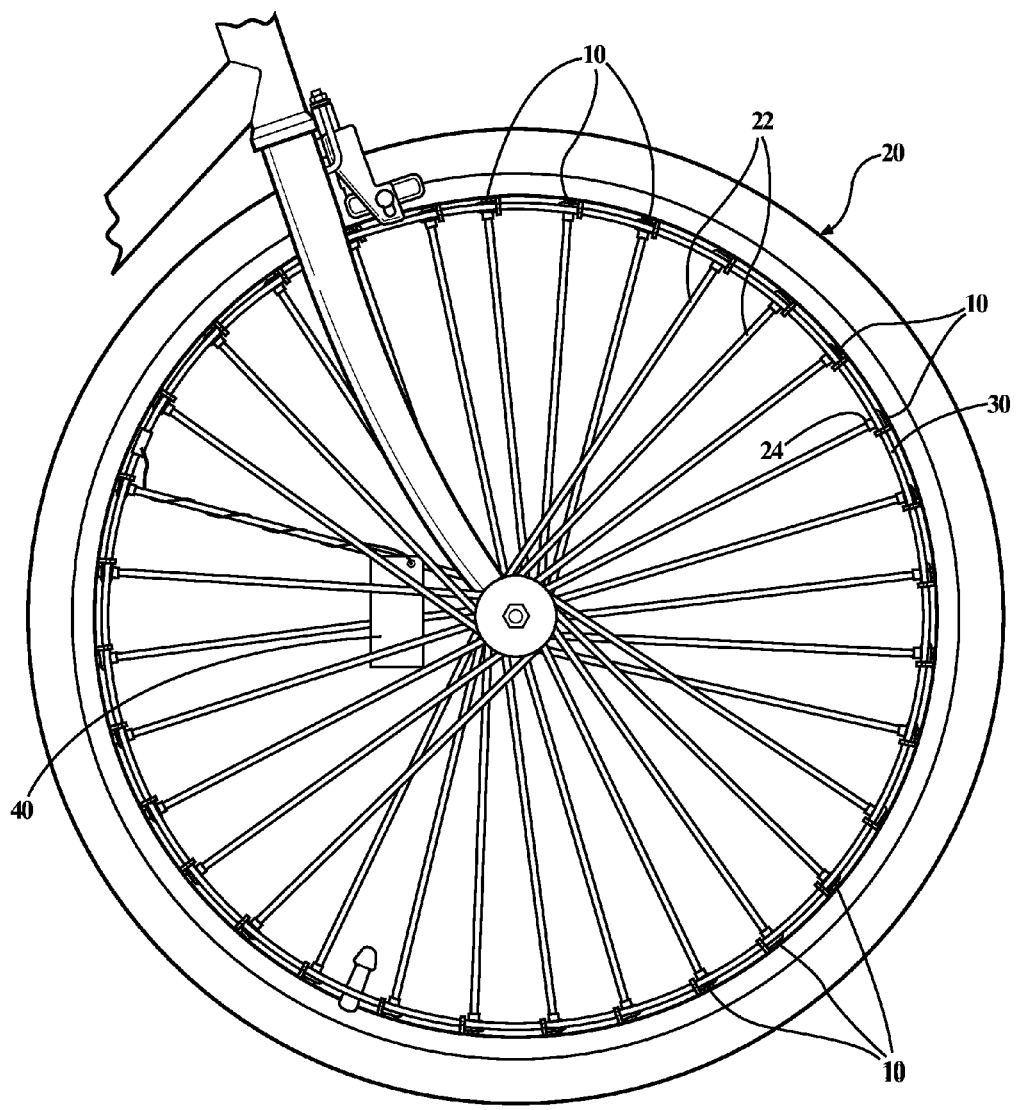
FIG. 5 is a side elevation view of the bike wheel with an array of clips according to FIG. 1, supporting lighted wire on the side of the wheel and showing a wire control/power box secured to rotate with the wheel.

FIG. 5 shows a bike wheel 20 with a completed array of clips 10 and EL wire 30. Clips 10 hold the wire securely adjacent the wheel rim 26 on spoke nuts 24, providing a steady circle of non-flickering, non-motion-dependent illumination when the wire is illuminated. Wire 30 may be powered and controlled by a combined battery power pack and controller unit 40, for example the commercially available Bikeglow™ kit. Battery pack/controller 40 is secured to the wheel 20 to rotate with the wheel, for example by taping or clipping it to spokes 30 so that it does not protrude beyond the spokes.

While the entirety of the illuminated wire 30 is preferably lit in a steady fashion all the way around the wheel to prevent distracting flickering at night, it would also be possible to use a flashing light pattern for wire 30, an option believed to be provided by the Bikeglow™ controller 40 with the press of a button.

While wire 30 is shown installed around the full circumference of wheel 20 in FIG. 5, the wire 30 could alternately be installed partway around the wheel with clips 10.

While actively-illuminated wire operated by a battery pack is shown in the illustrated example, and is preferred, "illuminated" could include reflective wire.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

What is claimed:

1. A clip for clipping illuminable wire to a bike spoke attached to a rim of a bike wheel with a spoke nut, the clip comprising:
   a spoke-engaging stem and an integral wire-mounting arm generally perpendicular to the stem, the stem being split by an open-ended slot running from an outer end of the stem toward the wire-mounting arm, the slot dividing the stem longitudinally into flexible sections and oriented generally perpendicular to the wire-mounting arm, the slot having an initial width at its outer end narrower than the diameter of a spoke, the slot terminating at its inner end in a spoke nut socket having a second width or diameter greater than the diameter of the slot and greater than the diameter of a bike spoke and approximately equal to or less than the width or diameter of a spoke nut, and the wire-mounting arm including at least one open-ended wire slot sized to securely receive and hold a wire on an axis generally parallel to the spoke-engaging stem.

2. The clip of claim 1, wherein the spoke nut socket comprises a material sufficiently soft to deform around a bike spoke nut.

3. The clip of claim 1, wherein the spoke nut socket has an axis generally perpendicular to an axis of the spoke-engaging stem.

4. The clip of claim 1, wherein the wire-mounting arm extends from only one side of the spoke-mounting stem, such that the spoke clip is generally L-shaped.

5. The clip of claim 1, wherein the wire-mounting arm extends from both sides of the spoke-mounting stem, such that the spoke clip is generally T-shaped.

6. In combination with a bike spoke attached to a rim of a bike wheel with a spoke nut, a clip for clipping illuminable wire to the spoke, and a length of illuminable wire secured by the clip to the spoke, the clip comprising:
   a spoke-engaging stem and an integral wire-mounting arm generally perpendicular to the stem, the stem being split by an open-ended slot running from an outer end of the stem toward the wire-mounting arm, the slot dividing the stem longitudinally into flexible sections and oriented generally perpendicular to the wire-mounting arm, the slot having an initial width at its outer end narrower than the diameter of the spoke, the slot terminating at its inner end in a spoke nut socket having a second width or diameter greater than the diameter of the slot and greater than the diameter of a bike spoke and approximately equal to or less than the width or diameter of the spoke nut, and the wire-mounting arm including at least one open-ended wire slot securely receiving and holding the illuminable wire on an axis generally parallel to the spoke-engaging stem.

7. The combination of claim 6, wherein the wire-mounting arm is generally perpendicular to the spoke-engaging stem and extends laterally outside of adjacent spokes but within a width of the wheel rim.

8. A system for illuminating a bike wheel, comprising:
   a plurality of generally L- or T-shaped spoke clips removably secured to the spoke nuts of a bike wheel adjacent the wheel rim, the spoke clips comprising spoke-engaging stems oriented in the plane of the wheel and wire-mounting arms generally perpendicular to the spoke-engaging stems and extending laterally outside of adjacent spokes but within a width of the wheel rim, and an illuminable wire mounted to the wire-mounting arms of the spoke clips in a generally planar array generally parallel to the plane of the wheel adjacent the wheel rim, the spoke clips and wire mounted to rotate with the spokes as the wheel rotates.

\* \* \* \* \*